No. 797,951. PATENTED AUG. 22, 1905.
W. H. GAY.
THREAD CUTTING THIMBLE.
APPLICATION FILED JUNE 7, 1905.
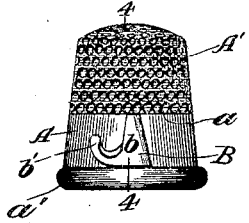
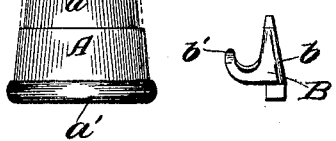
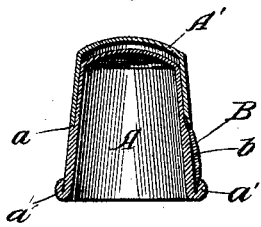
WITNESSES:
C. E. Duffy
Edw. W. Byrn.
INVENTOR
WALTER H. GAY
BY Munn & Co.
ATTORNEYS

UNITED STATES PATENT OFFICE.

WALTER HORN GAY, OF RICHMOND, VIRGINIA.

THREAD-CUTTING THIMBLE.

No. 797,951.      Specification of Letters Patent.      Patented Aug. 22, 1905.

Application filed June 7, 1905. Serial No. 264,103.

*To all whom it may concern:*

Be it known that I, WALTER HORN GAY, a citizen of the United States, residing at Richmond, in the county of Henrico and State of Virginia, have invented a new and useful Improvement in Thread-Cutting Thimbles, of which the following is a specification.

My invention relates to that class of thimbles which bear thread-cutting attachments. Such form of thread-cutter is a very convenient means for severing the thread from the work without the use of scissors and without biting off the thread and being always on the hand when sewing is always conveniently available.

My invention consists in a novel form of thread-cutting thimble of this class which is conveniently and cheaply made and which is not liable to cut the work nor the fingers and presents no unsightly projection from the thimble, as will be hereinafter fully described with reference to the drawings, in which—

Figure 1 is a side view of the thimble shown on an enlarged scale. Fig. 2 shows in side view the two-part thimble to which my cutter is applied, the parts being detached and juxtaposed. Fig. 3 is a detail of the cutter detached, and Fig. 4 is a sectional view taken through line 4 4 of Fig. 1.

In the drawings, A A' represent the two-part thimble, and B is the thread-cutter attachment.

The body part A is a frusto-conical cap having its upper portion recessed exteriorly at $a$ and having an upturned marginal bead $a'$ around its lower edge. The part A' is a detachable cap having a pitted surface for receiving the heel end of the needle. The part A' is designed to be tightly fitted onto the recessed portion $a$ of the body part of the thimble so as to be integral therewith.

The cutter consists of a flat body part $b$ and an upturned hook $b'$, which latter is brought to a sharp cutting edge on its concave side. This cutter is held onto the thimble by having the upper end of the body part $b$ caught between the lower edge of the pitted cap A' and the recessed portion of the body A and by having its lower end caught beneath the upturned lip of the marginal bead $a'$, the edges of the cap and the bead being snugly swaged down on the ends of the cutter-body so as to firmly hold it in place. This means of connection avoids all drilling of holes and all soldering or brazing and makes a smooth and firm connection. The cutter is slightly concaved on its inner side to conform to the curvature of the thimble and the cutting edge is so inclosed by the hook extension as to involve no possibility of accidental cutting of the fingers or the work, and the cutter lies flat against the thimble so as to make no unsightly or awkward projection.

To use the cutter, it is only necessary to draw the thread into the hook of the cutter and the sharp inner edge makes a clean severance of the thread.

The thimble may have either a closed upper end or an open upper end, the latter being the form used by tailors.

Having thus described my invention, what I claim as new, and desire to secure by Letters Patent, is—

1. A thread-cutting thimble comprising a body part having at its lower edge a marginal bead, a separate pitted cap and a cutter having one end caught and retained between the edge of the pitted cap and the body part, and its other end retained by the marginal bead.

2. A thread-cutting thimble comprising a body part having at its lower edge a marginal bead, a separate pitted cap, and a cutter consisting of a body part with a laterally-projecting curved hook sharpened on its inner edge, the top of the body part being retained between the edge of the pitted cap and the body of the thimble, and the bottom of the body part of the cutter being retained in the marginal bead of the thimble.

WALTER HORN GAY.

Witnesses:
    FRANK H. GIBSON,
    E. C. FOLKES.